United States Patent [19]

Killough et al.

[11] Patent Number: 4,658,634
[45] Date of Patent: Apr. 21, 1987

[54] METER PROVER

[75] Inventors: Ray B. Killough, Matthews; Alan S. Higgins, Charlotte; Thomas M. Broome, Waxhaw, all of N.C.

[73] Assignee: Piedmont Natural Gas Company, Charlotte, N.C.

[21] Appl. No.: 828,965

[22] Filed: Feb. 11, 1986

[51] Int. Cl.⁴ ............................................. G01F 25/00
[52] U.S. Cl. ........................................ 73/3; 138/26; 138/42
[58] Field of Search .................... 73/3; 138/42, 26

[56] References Cited

U.S. PATENT DOCUMENTS

| | | | |
|---|---|---|---|
| 2,147,671 | 2/1939 | Pratt | 138/42 |
| 2,401,570 | 6/1946 | Koehler | 138/26 |
| 2,429,297 | 10/1947 | Rudolph . | |
| 2,501,751 | 3/1950 | Aldridge . | |
| 2,631,614 | 3/1953 | Stephens | 138/26 |
| 2,707,033 | 4/1955 | Moerke et al. . | |
| 2,795,374 | 6/1957 | Isakoff . | |
| 2,943,641 | 7/1960 | Arnold . | |
| 3,114,430 | 12/1963 | Gallagher . | |
| 3,187,551 | 6/1965 | Hill | 73/3 |
| 3,273,375 | 9/1966 | Howe | 73/3 |
| 3,427,002 | 2/1969 | Wilding | 138/42 X |
| 3,523,557 | 8/1970 | Colter . | |
| 3,580,045 | 5/1971 | Pirehm | 73/3 |
| 3,741,009 | 6/1973 | Bordeaux | 73/3 X |
| 3,937,048 | 2/1976 | St. Clair et al. | 73/3 |
| 3,958,443 | 5/1976 | Berrettini | 73/3 |
| 4,027,523 | 6/1977 | St. Clair | 73/3 |
| 4,102,359 | 7/1978 | Patel | 138/42 |
| 4,106,328 | 8/1978 | Neeft | 73/3 |
| 4,152,922 | 5/1979 | Francisco, Jr. | 73/3 |
| 4,290,298 | 9/1981 | Severson | 73/3 |
| 4,463,613 | 8/1984 | Schmittner et al. | 73/3 X |
| 4,475,377 | 10/1984 | Halpine | 73/3 |
| 4,481,805 | 11/1984 | Dobesh | 73/3 |
| 4,566,307 | 1/1986 | Boyrin | 73/3 |
| 4,584,864 | 4/1986 | Neeft | 73/3 |

FOREIGN PATENT DOCUMENTS

| | | | |
|---|---|---|---|
| 1536140 | 8/1968 | France | 138/42 |
| 140919 | 4/1980 | German Democratic Rep. | 73/3 |
| 709071 | 5/1954 | United Kingdom | 73/3 |
| 637723 | 12/1978 | U.S.S.R. | 73/3 |

OTHER PUBLICATIONS

"Automatic Flowmeter Calibration"; *Instrument and Control Systems;* Sep. 1960; pp. 1537–1538; H. A. Lent.
"Calibration of the PR-2 High-Altitude Air Flowmeter"; The General Mills Electronic Group; Report No. 2347; 14 pages Title Page, Front Cover; Oct. 1962.
"Proving Liquid end Gas Flow Measuring Devices"; *Instrumentation and Control Systems;* vol. 41, No. 4, pp. 133–136; Apr. 1968; E. L. Upp.
Roots Dresser Reference Page Entitled "1200 Ft. 3 Prover Facts" by Dresser Measurement Division of Dresser Industries; published by Feb. 1986.
Roots Dresser Corporation, Model 4, Installation–Operation–Maintenance; Revision #2—Mar. 18, 1983, 3 Final Pages, 2 Front Pages, pp. i–ii, 3 page supplement pp. 1–61.
Nu-Tech Industries Corporation; Oklahoma City, Oklahoma; Mobile In-Line Prover by Feb. 1986; 2 page brochure.

*Primary Examiner*—Stewart J. Levy
*Assistant Examiner*—Tom Noland
*Attorney, Agent, or Firm*—Shefte, Pinckney & Sawyer

[57] ABSTRACT

A proving apparatus and method for large capacity rotary type gas meters having a blower assembly for connection downstream to the test meter, a pulsation dampener for connection upstream to the test meter, and a turbine-type reference meter for connection upstream to the pulsation dampener, whereby an ambient test air stream is drawn successively through the reference meter, the pulsation dampener, the test meter and the blower. This arrangement uniquely isolates the reference meter from the effects of the inherent flow pulsations produced by the rotary test meter so that the tested flow measurement from the reference meter is substantially accurate to, in turn, provide the most accurate calculation of the percentage proof of the test meter. A computer is utilized to control various aspects of the testing procedure and to analyze the test data.

33 Claims, 7 Drawing Figures

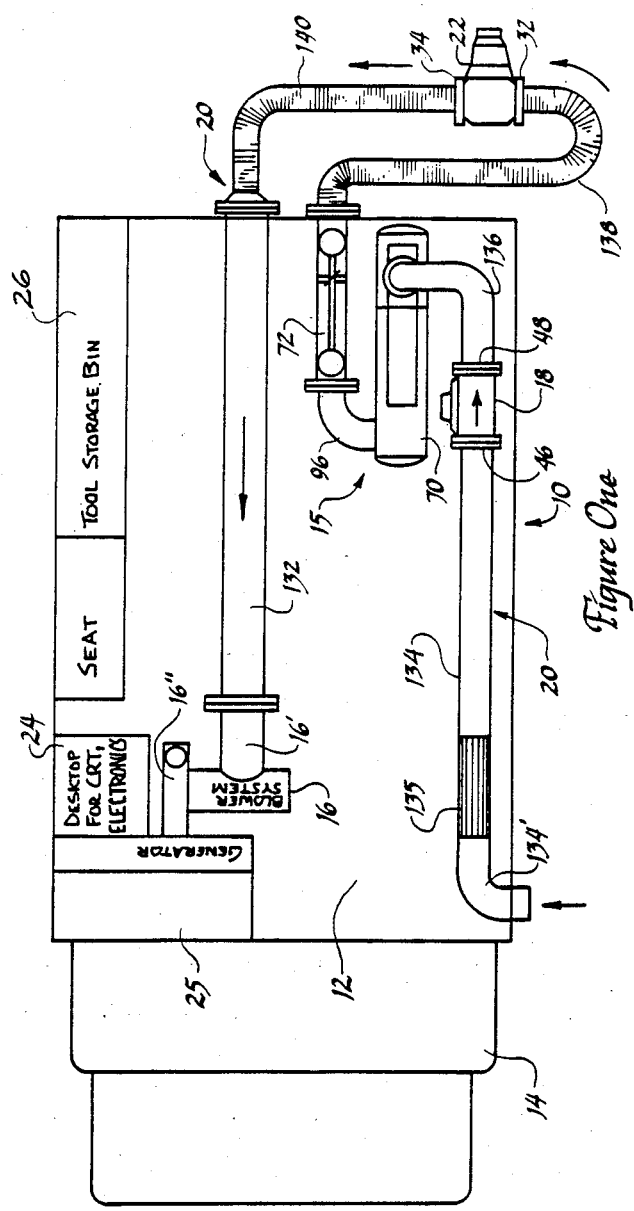

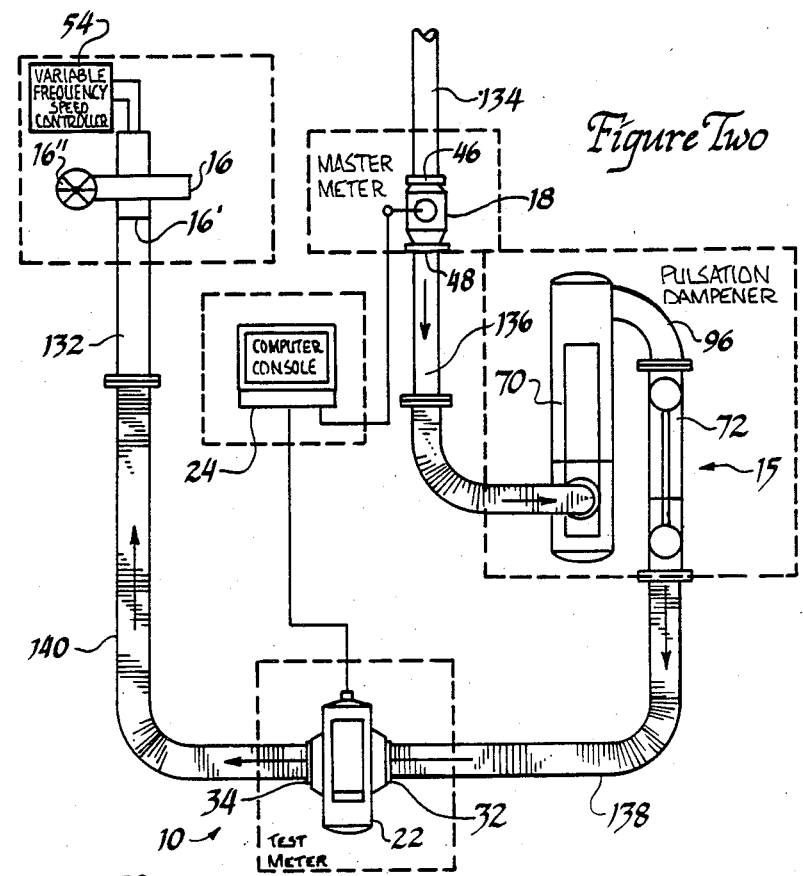
*Figure Two*
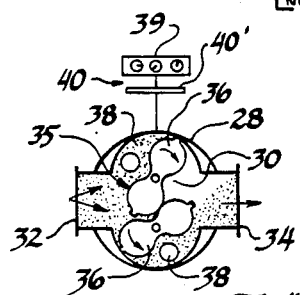
*Figure Two "A"*
PRIOR ART
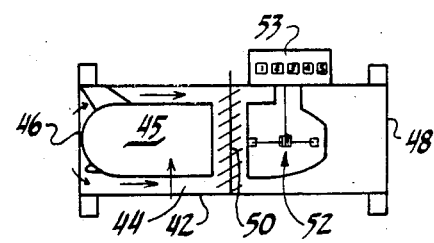
*Figure Two "B"*
PRIOR ART

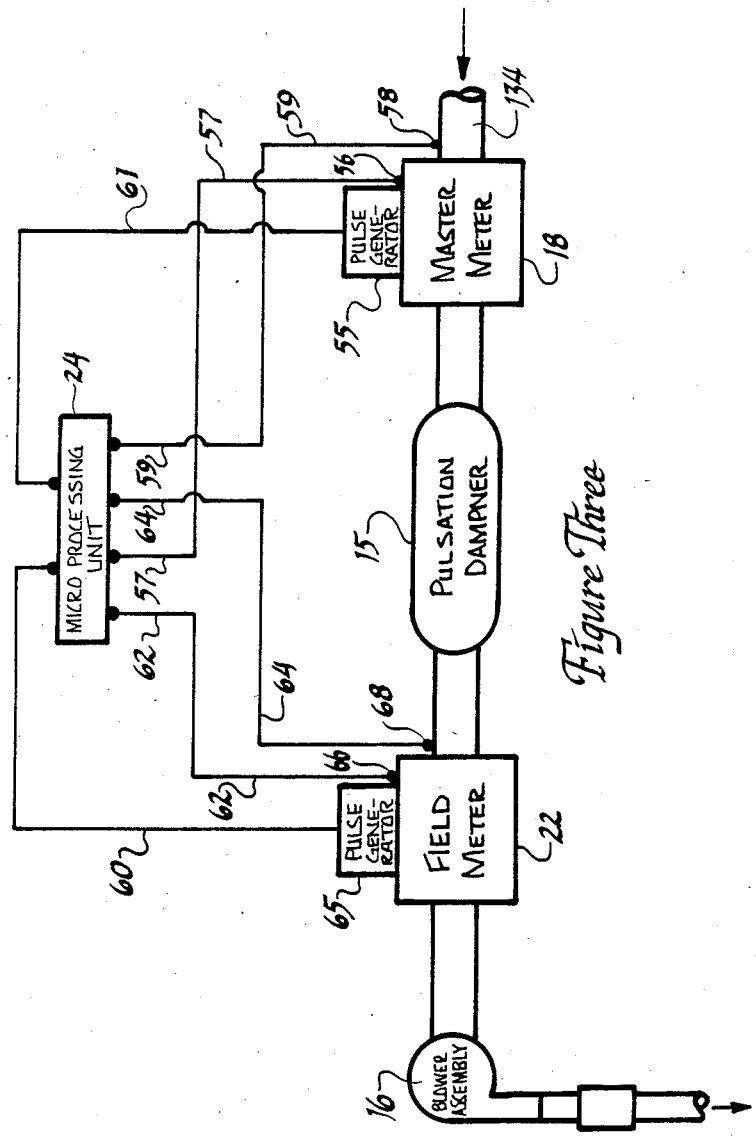
Figure Three

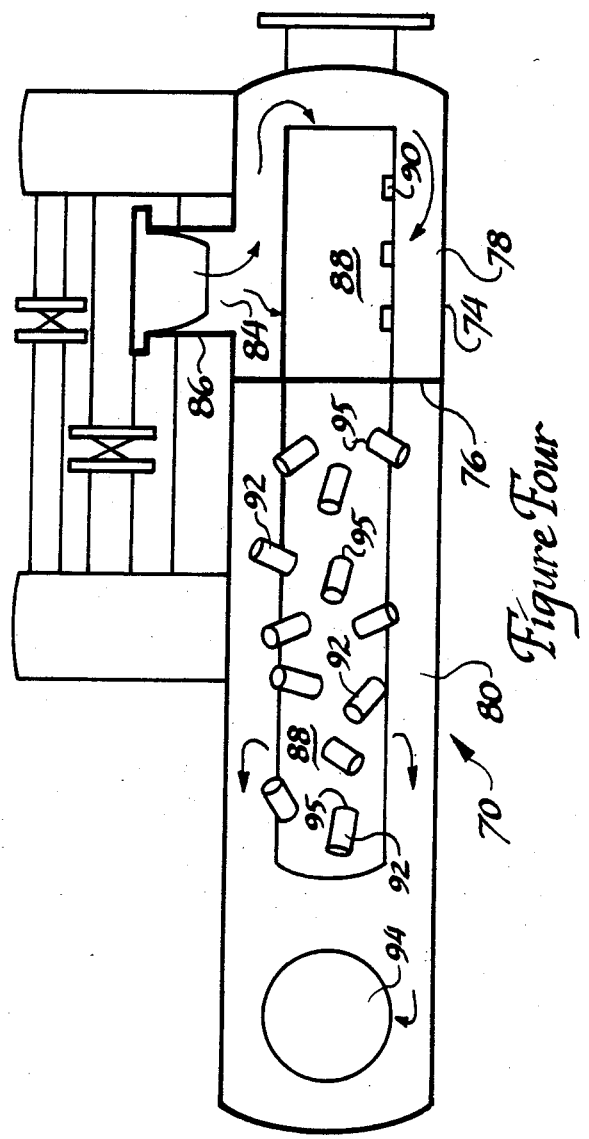
Figure Four

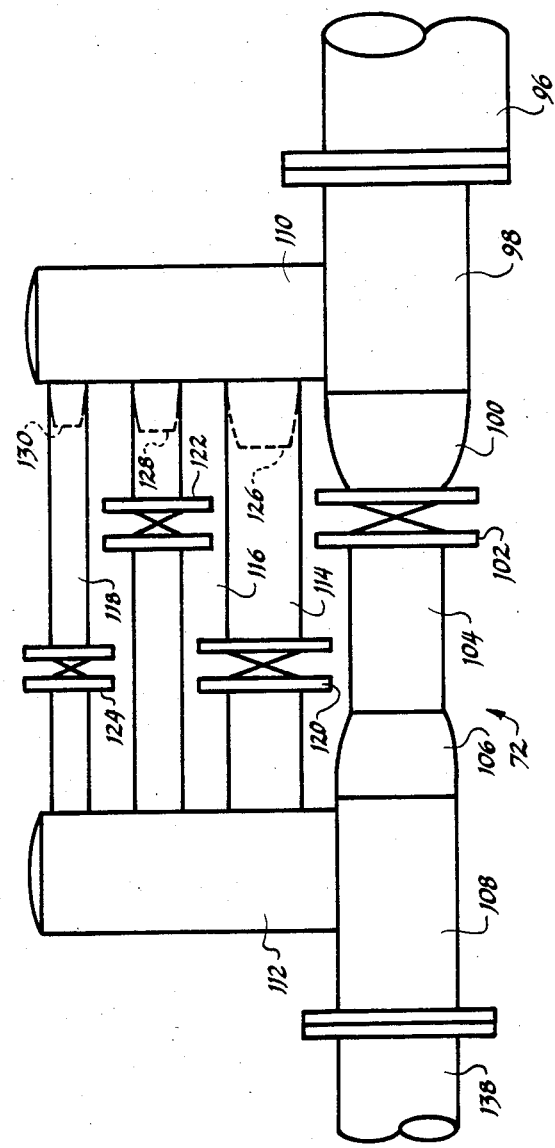

METER PROVER

BACKGROUND OF THE INVENTION

The present invention relates to apparatus and methods for proving the accuracy of gas flow meters and, more particularly, to such apparatus and methods particularly adapted for in-situ testing of large capacity gas meters of the rotary positive displacement type.

The gas flow measuring accuracy of gas meters utilized by natural gas utility companies to monitor and determine billing for the quantity of gas usage by its customers is, of course, a matter of significant concern and importance, particularly with respect to gas meters of relatively large capacities, e.g., in excess of 30,000 CFH (cubic feet per hour), such as utilized by manufacturing companies and other industrial customers. In most states, the governing body overseeing the operations of public utility companies specify that the accuracy of metering equipment shall be tested by comparison of the meter's accuracy with the known accuracy of a standard, such as that provided by so-called transfer testing wherein a volume of air is passed through both a meter to be tested and a calibrated reference meter to permit comparison of the respective gas flow measurements generated by each meter. Portable so-called meter proving equipment is commercially available for this purpose but characteristically is capable of handling only relatively low rates of air flow in the range of less than 12,000 CFH. Accordingly, inasmuch as it is necessary that a meter be tested in the range of 50% to 80% of its full capacity to obtain an acceptable test of the meter's accuracy, such proving equipment is wholly incapable of providing reliable testing of large capacity gas meters and instead is utilized only for proof testing of residential and other small capacity gas meters.

Accordingly, whenever it becomes necessary to test the accuracy of large capacity meters in field use, such as when requested by the customer in response to an apparently unusually high meter reading, it has been common industry practice to conduct differential testing in the case of meters of the rotary positive displacement type and spin testing of meters of the turbine wheel type. Specifically, in differential testing of rotary type meters, manometer testing is conducted at the inlet and outlet of the meter to determine the differential in the gas flow rate on each side of the meter. In the spin testing of turbine type meters, the turbine wheel of the meter is spun to a given speed and the time required for the wheel to slow to a stop is measured. Each type of test essentially only determines whether or not any unusual source of friction exists within the mechanical working components of the particular test meter, which only indirectly provides an indication as to the flow measuring accuracy of the meter. Other than this type of testing, the only remaining feasible manner of proving the accuracy of a large capacity meter is to take it out of service and return it to the manufacture for proof testing, which of course is ordinarily prohibitively expensive.

One of the practical problems in designing an apparatus for proof testing of large capacity gas meters is that a predominant number of such meters in service are of the rotary positive displacement type wherein a rotary valve member is adapted during rotation to pulsingly capture and convey essentially discrete measured quantities of gas which, when connected in line with a reference meter, greatly disturbs the measuring accuracy of the reference meter. Specifically, the pulsations inherently created by such a rotary type meter typically cause the reference meter to measure more than the actual gas volume passing therethrough and, in comparison, the rotary test meter therefore appears to be measuring less than actual gas volume, thus producing an invalidly low percentage proof calculation for the rotary test meter. This problem perhaps as much as any has retarded efforts to develop a reliable meter proving apparatus for mobile use in field testing large capacity rotary type gas meters, whereby only very large, non-mobile, and expensive meter proving equipment such as that typically maintained in the manufacturing facilities of meter manufactures is known to exist for accurately proving the flow measuring accuracy of such meters.

In contrast, the present invention provides an inexpensive reliable proving apparatus capable of being conveniently mounted on an ordinary flat bed truck or housed in an ordinary van-type truck for on-site transfer testing of large capacity rotary gas meters in field use.

SUMMARY OF THE INVENTION

Briefly described, the present invention provides an apparatus and method for proving the gas flow measuring accuracy of a test meter of the rotary positive displacement type, wherein a blower or the like is utilized for creating a moving gas stream at a selected flow rate and an arrangement of conduits, hoses or the like is utilized for directing a selected quantity of the gas stream successively first through a meter reference meter of the turbine wheel type and then through the rotary test meter to permit comparison of the gas flow measurements by each thereof for determining the percentage accuracy of the test meter in comparison with the master reference meter. In this manner, the natural rotary pulsations of the test meter do not significantly affect the gas flow measuring accuracy of the master reference meter so as to provide substantially accurate proving of the accuracy of the test meter.

The rotary type meters for which the present invention is particularly adapted basically have a rotary valve member adapted during rotation to pulsingly capture and convey essentially discrete measured quantities of gas, together with a device for measuring gas flow through the rotary meter in direct relation to the number of revolutions of the rotary valve member. The turbine type master reference meter utilized in the present invention basically includes a rotary turbine wheel adapted to be rotated kinetically by the flow of gas therethrough, together with a respective device for measuring gas flow through the turbine master reference meter in direct relation to the speed of rotation of the turbine wheel.

In the preferred embodiment of the present invention, a pulsation dampener capable of dampening the flow pulsations of the rotary test meter is provided. The conduit arrangement is utilized to connect the inlet of the blower in fluid communication with the outlet of the rotary test meter, to similarly connect the inlet of the rotary test meter in fluid communication with the outlet of the pulsation dampener, and to connect the inlet of the pulsation dampener in fluid communication with the outlet of the master reference meter so that the blower is arranged downstream to create and draw a moving ambient air stream at the selected flow rate successively first through the upstream turbine master reference meter, then through the pulsation dampener, and finally through the rotary test meter. In this manner, the master reference meter is isolated from the inherent rotary pulsations of the rotary test meter to minimize their affect on the master reference meter.

A microprocessor is provided in operative association with the rotary test meter and the master reference meter for correcting the gas flow measurements by each thereof for the prevailing pressure and temperature of the air stream, comparing the corrected measurements, and calculating the percentage accuracy of the rotary test meter in comparison with the master reference meter.

The master reference meter, the blower, the pulsation dampener, the conduit arrangement, and the microprocessor are disposed in their operative relationships on a mobile test vehicle to facilitate transportation to and from test meters in field use for in situ proving of such test meters. The blower is selectively adjustable for varying the selected flow rate of the air stream to permit proving of the test meter at varying flow rates representing differing degrees of the test meter. The conduits utilized for connecting the master reference meter, the pulsation dampener, the rotary test meter, and the blower are preferably of an oversized cross-sectional area in relation to the inlet and outlet of the rotary test meter to permit volumetric expansion of the air stream within the hose to tend to smooth the flow pulsations created in the air stream by the rotary test meter.

The pulsation dampener includes a gas flow conduit arrangement having a tubular housing with an entrance end section and an exit end section and a baffle assembly intermediate the entrance and exit end sections for defining an indirect flow path for the moving air stream through the tubular housing. The baffle assembly includes an annular barrier wall extending transversely into the interior of the tubular housing intermediate its entrance and exit end sections and a flow pipe extending from within the entrance end section of the tubular housing to within the exit end section thereof through the barrier wall to provide fluid communication between the entrance and exit end sections. The flow pipe has an entrance opening in the portion thereof within the entrance end section and a plurality of peripheral exit openings arranged spirally about in portion of the flow pipe within the exit end section. A respective plurality of tubular extension members are fitted in the exit openings and extend outwardly from the flow pipe at diverse respective angles thereto for dispersing the air stream multi-directionally from the flow pipe in the exit end section of the tubular housing. The conduit arrangement of the pulsation dampener further includes a plurality of secondary tubular flow conduits each connected independently in fluid communication with the exit end section of the tubular housing. The secondary flow conduits are of differing cross-sectional areas and each is provided with a valve assembly for selectively opening and closing the respective secondary flow conduit for selective gas flow operation individually in relation to the selected flow rate of the air stream. Each of the secondary flow conduits has a restrictor nozzle positioned therein for creating acceleration of the gas stream. In this manner, the pulsation dampener is adapted to dampen and smooth the pulsations in the air stream created by the rotary test meter throughout a substantially wide range of varying flow rates at which the blower may be set.

BRIEF DESCRIPTION OF THE DRAWINGS

FIG. 1 is a schematic plan view illustrating the layout of the meter proving apparatus of the present invention on a truck bed or other mobile test vehicle;

FIG. 2 is a schematic flow diagram of the meter proving apparatus of the present invention;

FIG. 2A is a schematic illustration of a representative rotary type meter for which the proving apparatus of the present invention is particularly adapted;

FIG. 2B is a schematic illustration of a representative turbine meter of the type utilized in the proving apparatus of the present invention.

FIG. 3 is a schematic diagram of the operative electrical association of the microprocessor of the present proving apparatus respectively with the test meter and the master reference meter;

FIG. 4 is an elevational view of the first stage of the pulsation dampener of the present proving apparatus; and FIG. 5 is an elevational view of the second stage of the pulsation dampener of the present proving apparatus.

DESCRIPTION OF THE PREFERRED EMBODIMENT

Referring now to the accompanying drawings and initially to FIGS. 1 and 2, the meter proving apparatus of the present invention is indicated generally at 10 in FIG. 1 in its preferred embodiment mounted on the cargo bed 12 of an ordinary commercial-type truck 14 for mobile transportation of the apparatus 10 to and from the field locations of gas utility meters for in situ proving of such meters. In FIG. 2, the basic layout of the various components of the present meter proving apparatus 10 is shown in a schematic flow diagram format.

The proving apparatus 10 is particularly designed and adapted for the accuracy testing of large capacity gas meters, i.e., those whose capacities are in the range of 30,000 to 100,000 CFH (cubic feet per hour). Basically, the proving apparatus 10 includes a high capacity conventional fan-type air blower 16, a master reference meter 18, a pulsation dampener 15, and an arrangement of tubular conduits and hoses, generally indicated at 20, for connecting the blower 16, master reference meter 18, the pulsation dampener 15, and the master to be tested, indicated generally at 22, in series in fluid communication, as hereinafter more fully described. A microprocessor-controlled computer console, indicated generally at 24 is provided, with an electrical generator 25 supplying operating electrical power for the blower 16 and the computer console 24. Suitable storage cabinets 26 are provided on the truck bed 12 for appropriate tools and other equipment.

As previously mentioned, the proving apparatus 10 is particularly designed and adapted for the testing of meters of the rotary positive displacement pulsation type, as represented by the test meter 22. Representative examples of such rotary type test meters 22 are the models 23M, 38M, 56M and 102M meters manufactured by Roots Dresser Corp. of Houston, Tex., a schematic illustration of which appears in FIG. 2A. Basically, such rotary meters includes a housing 28 defining a valve chamber 30 intermediate inlet and outlet openings 32,34 in the housing, the inlet 32 being adapted to be connected in fluid communication with a gas supply (not shown) and the outlet 34 being adapted to be connected in fluid communication to a furnace or other location of gas usage (also not shown). A valve arrangement 35 is disposed within the valve chamber 30 and basically includes a pair of counter-rotating lobe-type rotors 36 which are adapted upon rotation to capture the gas supplied to the inlet 32 in essentially discrete quantities in pocket ares 38 defined between the rotors 36 and the housing 28 and to discharge the gas at the outlet opening 34. In this manner, the rotary meter inherently creates a pulsing flow of the gas. In such rotary meters, the volume of gas flow therethrough is directly related to the number of revolutions of the rotary valve arrangement 35. Accordingly, such meters typically include a gear train, representatively indicated at 40, connected with the valve rotors 36 and to a rotary dial arrangement 39 to display a totalized volume of gas flow through the meter in direct proportion to the rotational movement of the valve roters 36. As is conventional, the housing 28 of the meter 22 includes a fitting (not shown) for providing communication to the chamber 30 to permit testing of the gas pressure developed therein.

The master reference meter 18 of the present apparatus 10 is of the turbine wheel type, a preferred example of which is the Model T-60 Mk II meter manufactured by Rockwell International Corp. of Pittsburgh, Pa., which is schematically illustrated in FIG. 2B. Advantageously, this meter has a capacity range from 8,000 CFH to 80,000 CFH. Basically, the turbine master reference meter 18 includes a housing 42 defining a turbine chamber 44 intermediate inlet and outlet openings 46,48 in the housing for respective connection to a gas supply (not shown) and a location of gas usage (also not shown). A nose cone restriction 45 is disposed centrally in the chamber 44 to define a constricted annular gas flow area, with a turbine or propeller wheel 50 being rotatably mounted in the chamber 44 immediately downstream of the restriction 45 to be rotated kinetically by the flow of gas through the annular area. In this type of meter, the speed of rotation of the turbine wheel 50 is essentially proportional to the rate of gas flow whereby the volume of gas flowing through the meter is directly related to the speed of rotation of the turbine wheel 50. Accordingly, the turbine meter 18 includes a gear train 52 operatively connecting with the turbine wheel 50 with a readout dial or device 53, the gear train incorporating a pulse generating device 55 (FIG. 3) adapted to produce a series of electrical pulses in direct relation to the speed of rotation of the turbine wheel 50 which operate the readout device 53 to display a totalized volume of gas flow through the meter 18. The master reference meter 18 also includes a fitting (not shown) in the housing 42 thereof for communication with the chamber 46 for testing the gas pressure therein. Of course, as those persons skilled in the art will recognize, any other comparable turbine type meters may be utilized as the master reference meter 18.

The blower 16 is a conventional model 530-250 manufactured by Aerovent, Inc., of Piqua, Ohio, and is rated for 100,000 CFH at thirty inches of water column differential between the inlet and outlet of the blower. A variable frequency speed controller 56 is operatively connected to the blower motor and is provided with an ordinary potentiometer (not shown) to facilitate selective control of the flow rate of the blower 16. The generator 25 is a three phase generator manufactured by Onan Owsley and Son, Inc., of Fort Mill, S.C.

The pulsation dampener 15 is best seen in FIGS. 4 and 5 and basically includes a first stage indicated generally at 70 in FIG. 4, and a second stage, indicated generally at 72 in FIG. 5. The first stage 70 of the pulsation dampener 15 includes a cylindrical tubular conduit housing 74 approximately twenty inches in diameter and closed at each end. An annular barrier wall 76 extends transversely into the interior of the tubular conduit housing 74 intermediate its ends to divide the interior of the tubular conduit housing 74 into entrance and exit end sections 78,80 respectively. An entrance opening 84 approximately ten inches in diameter is formed in the periphery of the tubular conduit housing 74 in its entrance end section 78 and a flanged entrance fitting 86 extends radially outwardly from the housing 74 about the opening 84. A cylindrical flow pipe 88 approximately ten inches in diameter extends centrally through the barrier wall 76 from within the entrance end section 78 of the housing 74 to within the exit end section 80 of the housing 74. The end of the flow pipe 88 within the entrance end section 78 is open, while the end of the flow pipe within the exit end section 80 is closed. The portion of the flow pipe 88 within the entrance end section 78 includes several entrance openings 90 in the periphery of the flow pipe 88 opposite the entrance opening 84 in the housing 74. The portion of the flow pipe 88 within the exit end section 80 has a plurality of two inch diameter openings 95 formed in the pipe's periphery in a spiral arrangement, with two inch long cylindrical extension tubes 92 being fitted respectively in the openings 90 to extend outwardly from the flow pipe 88 at diverse respective angles thereto. An exit opening 94 approximately twelve inches in diameter is formed in the periphery of the housing 74 in its exit end section 80 and a tubular flanged elbow fitting 96 also approximately twelve inches in diameter extends outwardly from the housing 74 about the exit opening 94.

The second stage 72 includes a tubular cylindrical flanged fitting 98 of a corresponding twelve inch diameter affixed to the flanged elbow fitting 96. A conical reducer section 100 extends coaxially from the fitting 98 to a reduced eight inch diameter and is connected through an intermediate shut-off valve 102 to an eight inch cylindrical pipe section 104. Another conical section 106 extends from the pipe 104 to an increased ten inch diameter and is connected coaxially with a flanged tubular cylindrical fitting 108. The cylindrical fittings 98,108 respectively include peripheral openings formed therein in which cylindrical header sections 110,112 are fitted and extend radially outwardly in parallel relation. Three cylindrical pipe sections 114,116,118 respectively of six inch, four inch and three inch diameters are fitted in facing openings in and extend communicatively between the headers 110,112, each pipe section 114,116,118 having a respective shut-off valve 120,122,124 therein. Each pipe section 114,116,118 further includes a respective conical reducer member 126,128,130 fitted taperingly in the pipe's entrance end. Thus, the second stage 72 of the pulsation dampener 15 provides four flow paths of differing diameters, each of which independently communicates with the exit opening 94 of the first stage housing 74, the shut-valves 102,120,122,124 permitting selective use of any one of the flow paths.

The first stage 70 of the pulsation dampener has been found to effectively smooth and control pulsations in a gas stream flowing therethrough at flow rates above 45,000 CFH. The barrier wall 76 in conjunction with the flow pipe 88 effectively provides a baffle causing the gas stream to assume an indirect flow path through the tubular housing 74. Specifically, the gas stream must enter the flow pipe in the entrance end section 78 of the housing 74 either through the end of the flow pipe 88 or through the entrance openings 90 which face away from the entrance opening 84 to the housing 74. The gas stream exits the flow pipe 88 through the exit openings 95 and the extension members 92, by which the gas stream is dispersed multi-directionally from the flow pipe 88 into the exit end section 80. The main flow path of the second stage 72 of the pulsation dampener 15 defined by the fittings 98,108 and the pipe section 104 therebetween is adapted for handling the gas stream exiting the first stage 70 through the elbow fitting 96 at flow rates in excess of 45,000 CFH, while the flow path defined by the pipe sections 114,116,118 are respectively adapted for handling gas streams of flow rates less than 45,000 CFH, the six inch pipe section 114 being adapted for flow rates between 35,000 and 45,000 CFH, the four inch pipe section 116 being adapted for gas flow rates between 15,000 and 25,000 CFH, and the three inch pipe section 118 being adapted for flow rates below 15,000 CFH. Depending upon the prevailing gas flow rate, the shut-off valve in the suitable pipe section 104,114,116,118 is opened and the other shut-off valves are closed. The conical reducer sections 100,126,128,130 in the respective conduit sections of the second stage 72 function as a reducing nozzle to create an accelerative flow of the gas stream therethrough which serves to smooth out pulsation peaks in the gas stream.

The conduit arrangement 20 basically provides tubular conduit sections and hose to connect the inlet 16' of the blower 16 in fluid communication with the outlet 34 of the rotary test meter 22, to connect the inlet 32 of the rotary test meter 22 in fluid communication with the outlet fitting 108 of the second stage 72 of the pulsation dampener 15, and to connect the inlet fitting 86 of the first stage 70 of the pulsation dampener 15 in fluid communication with the oulet 48 of the master reference meter 18. The outlet 16" of the blower 16 and the inlet 46 of the master reference meter 18 are arranged by the conduit arrangement 20 in communication with the ambient atmosphere. Thus, the blower 16 is located most downstream from the other components while the master reference meter 18 is located most upstream, with the test meter 22 being located therebetween and the pulsation dampener 15 intermediate the master reference meter 18 and the test meter 22. In this manner, the blower 16 is adapted to draw a moving gas stream successively first through the master reference meter 18, then through the pulsation dampener 15, and then through the rotary test meter 22. The master reference meter 18 is therefore separated by the pulsation dampener 15 from the rotary test meter 22 to isolate the master reference meter 18 from the inherent rotary pulsations in the gas stream created by the rotary test meter 22.

The computer console 24 is a model 1130D microprocessor-controlled computer including an input keyboard, a CRT screen display, appropriate pressure and temperature transducers and a printer, manufactured by Adaptrol, Inc., of Pontiac, Mich. This computer is provided by Adaptrol as standard equipment in a small capacity gas meter proving apparatus which it manufactures, the computer incorporating in the internal microprocessing unit thereof Adaptrol's proprietary software specifically adapted for meter proving applications involving transfer-type proving operations, the program of which is modified for the higher flow rates and the unique aforementioned upstream arrangement of the master reference meter 18 of the present apparatus. As schematically illustrated in FIG. 3, the pulse generator 55 of the turbine master reference meter 18 is electrically connected by a lead 61 to the internal microprocessing unit of the computer console 24 which is programmed to count the electrical pulses produced by the pulse generator 55 and to compute therefrom the volume of gas flow through the master reference meter 18. According to the principle of Boyle's law, the volume of a gas varies in relation to its pressure. Similarly, according to Charles' law, the volume of a gas varies in relation to its temperature. Accordingly, a suitable pressure transducer (not shown) is provided as mentioned above within the computer console and is operatively connected to a static air line 57 extending from the pressure fitting 56 in the housing 42 of the master reference meter 18 to the computer console 24, the pressure transducer operating to convert the sensed gas pressure within the master reference meter to a proportionate voltage and to feed the voltage to the microprocessor unit of the computer console 24. Similarly, the computer console is provided with a temperature transducer (not shown) which is operatively connected through an electrical lead 59 with a resistance probe 58 fitted in an opening through the inlet conduit 134 to the master reference meter 18, the resistance probe 58 operating to produce a resistance to electrical current flow in direct relation to the sensed gas temperature within the master reference meter 18 and the temperature transducer operating to convert the resistivity to a proportional voltage which is fed to the internal microprocessing unit of the computer console 24. The microprocessor is programmed to appropriately correct the calculated volume of gas flowing through the master reference meter 18 for the detected pressure and temperature values of the gas according to Boyle's law and Charles' law.

Similarly, the microprocessing unit of the computer console 24 is operatively electrically connected by an electrical lead 60 to a pulse generator 65 adapted for mounting to the rotating dial component 40' of the gear train 40 of the test meter 22 for generating a series of electrical pulses in direct relation to the number of revolutions of the valve rotors 36 of the test meter and the microprocessor is appropriately programmed to count the pulses produced by the pulse generator 65 and compute the volume of gas flow through the test meter 22. Another pressure transducer (not shown) within the computer console is connected through a static air line 62 from the pressure fitting 66 of the test meter 22 to deliver to the microprocessor unit a converted voltage proportionate to the sensed gas pressure within the test meter 22. Similarly, another temperature transducer (not shown) within the computer console is connected through an electrical lead 64 with a resistance temperature probe 68 fitted in an opening in the inlet conduit 138 to the test meter 22 for delivering to the microprocessor unit a converted voltage proportionate to the sensed gas temperature within the test meter 22. The microprocessor is programmed to correct the calculated volume of gas flow through the test meter 22 for the sensed pressure and temperature values.

The microprocessing unit of the computer console 24 is also programmed to calculate the particular gas flow rate through the conduit arrangement 20 from the pulses of the pulse generator 55 of the master reference meter 18 and the pressure and temperature voltage values obtained from the pressure and temperature transducers associated with the master reference meter 18, and the microprocessing unit is programmed to display the prevailing flow rate on the CRT screen of the computer console 24. The microprocessing unit is additionally programmed to accept the input from the computer keyboard of a predetermined desired test volume of gas and to compute and correct the measured volume from the electrical pulses of the pulse generators 40,52 of the test and reference meters 22,18, respectively, only for such programmed test volume as measured by the master reference meter 18. As will be understood, the master reference meter 18 is of a known repeatably accurate gas flow measuring capability, the degree of accuracy of which varies in a known relation to the rate of gas flow through the master reference meter 18 as plotted on the manufacturer's accuracy curve for the master, all as is conventional. The microprocessing unit of the computer console 24 is accordingly further programmed to receive input from the computer keyboard of the manufacturer's specified accuracy factor for the reference meter 18 for the particular gas flow rate through the master reference meter 18 and to also correct the calculated gas volume according to the appropriate correction factor. The microprocessor is also programmed to compare the computed and corrected gas flow volume readings from each of the reference and test meters 18,22 upon completion of the programmed test volume and to calculate therefrom the percentage proof or accuracy of the test meter 22 in relation to the master reference meter 18.

The microprocessing unit is programmed to provide suitable displays on the CRT screen to prompt the operator to input the necessary data to begin the proof testing of any given test meter 22; namely, the correction factor of the master reference meter 18 for the selected gas flow rate, the pulse counts per revolution of the valve member of the test meter, and the test volume. The microprocessing unit also is programmed to record and display the pulse counts of each of the reference and test meters 18,22 and the temperature and pressure readings therefrom during the course of a test and to display on the CRT screen all pertinent test date upon completion of the test, which may be printed to provide a permanent copy of the test results.

As will be understood, the described components of the apparatus 10 may be mounted in various arrangements on the truck bed 12 or on any other suitable mobile test vehicle, one preferred arrangement of the apparatus 10 being shown in FIG. 1. The generator 25 is mounted immediately behind the cab of the truck 14, with the blower 16 and the computer console 24 powered by the generator 25 being mounted in close proximity thereto. The conduit arrangement 20 includes an elongate flanged cylindrical conduit 132 fixedly mounted lengthwise to the truck bed 12 with the forward flanged end of the conduit 132 rigidly affixed to the blower inlet 16' and the flanged rearward end of the conduit 132 disposed at the tail end of the truck bed 12. The outlet 16" of the blower 16 is connected to another cylindrical conduit (not shown) which extends through and beneath the truck bed 12 to exhaust the blower 16 to atmosphere. The master reference meter 18 and the pulsation dampener 15 are affixed to the truck bed 12 adjacent one another and the conduit section 132, with the master reference meter 18 located forwardmost on the truck bed 12. An inlet conduit section 134 is affixed lengthwise to the truck bed 12 with its forward end formed as an elbow portion 134' opening to atmosphere laterally of the truck bed 12 and its rearward end affixed to the inlet 46 of the master reference meter 18. A filtering assembly 135 is provided in the conduit section 134 to remove debris and other foreign matter from the ambient air drawn into the apparatus 10. A flanged conduit section 136, which may be a flexible hose, is affixed at one end to the outlet 48 of the master reference meter 18 and at its other end to the inlet fitting 86 of the pulsation dampener 15. The pulsation dampener 15 is positioned on the truck bed 12 with the outlet fitting 108 of the second stage 72 of the pulsation dampener 15 disposed rearwardly at the tail end of the truck bed 12. The conduit arrangement 20 also includes flexible flanged hose sections 138,140 by which the rearward flange end of the conduit section 136 may be connected in fluid communication with the inlet 32 of a field test meter 22 and the rearward flanged end of the conduit 132 may be connected in fluid communication with the outlet 34 of the field test meter 22. Thus, when the truck 14 is maneuvered to position the tail end of its truck bed 12 adjacent the location of a field meter to be tested in situ, the field meter may be readily connected with the proving apparatus 10. The hose sections 138,140, as well as the other conduit sections 134,135,136, are of diameters of ten inches or greater so as to be of oversized cross-sectional areas in relation to the normal inlet and outlet openings 32,34 of typical large capacity rotary meters of the aforementioned type, whereby gas flowing through the conduit arrangement 20 will be enabled to expand volumetrically, particularly in the hoses 138,140, to further aid in smoothing the pulsation peaks in the gas stream caused by the rotary test meter 22.

In operation, the truck 14 will be driven to and from various field locations of meters to be tested and, at each location, will be positioned to orient the tail end of the truck bed 12 adjacent the test meter. The ordinary gas flow conduits connected to the inlet 32 and outlet 34 of the test meter 22 are detached therefrom and connected together for continued gas service to the customer's site during the conduct of the test. The hose 138 is then connected at one end to the flanged rearward end of the conduit section 136 and at the other end to the inlet 32 of the test meter 22, while similarly the hose 140 is connected at one end to the outlet 34 of the test meter 22 and to the flanged rearward end of the conduit section 132. The pulse generator 65 at the extending end of the electricl lead 60 is mounted on the rotary dial member 40' of the gear train 40 of the test meter 22 for rotation therewith. Similarly, the extending end of the static pressure line 62 is fitted in the pressure fitting 66 of the test meter 22 and the temperature probe 68 at the extending end of the electrical lead 64 is fitted in the opening of the hose section 138 adjacent the inlet 32 of the test meter 22. The corresponding pulse generator 55 and sensors 56,58 are, of course, already affixed to the master meter 18 and the conduit section 134 at the inlet 32 thereto.

The electrical generator 25 is then activated to supply operating electrical power to the blower 16 and to the computer console 24. The blower 16 and the computer console 24 are energized and, utilizing the speed controller 54 mounted on the blower 16 and the flow rate readout capability of the computer console 24, the blower 16 is adjusted to draw an ambient airstream at a predetermined flow rate through the conduit system 20, the master reference meter 18, the pulsation dampener 15, and the test meter 22. Finally, the operator inputs into the microprocessor of the computer console 24 the manufacturer's correction factor for the master reference meter 18 at the prevailing flow rate to which the blower 16 has been set, the particular number of pulses per revolution of the valve arrangement 36 of the particular test meter 22, and the desired total volume of air to be drawn through the apparatus 10 for the test.

Thereupon, the operator inputs into the computer 24 the appropriate command to begin the test, at which time the computer 24 begins its programmed acquisition and evaluation of the meter pulses from the master and test meters 18,22 and the pressure and temperature readings from the sensors associated with each meter. Once the predetermined test volume of air has been measured by the test meter 22 as indicated by the number of pulses received from the pulse generator 65 attached thereto, the computer console 24 automatically blocks any further electronic input from the pulse generators and sensors at each of the reference and test meters 18,22, computes the final test volume readings based on the number of pulses received from each of the meters 18,22, corrects each of the test volume readings for the prevailing temperature and pressure readings from the sensors at each meter 18,22, and compares the corrected volume measurements of each meter 18,22 to produce a numerical reading of the flow measuring accuracy of the test meter 22 expressed as a percentage of the corrected flow measurement by the master reference meter 18.

Typically, to provide a reliably accurate proof of the test meter's measuring accuracy, the testing in this described manner will be conducted several times at differing flow rates representing differing degrees of the flow capacity of the test meter. Ordinarily, four such tests will be conducted respectively at flow rates representing 20%, 40%, 60% and 80% of the rated capacity of the test meter 22. Following completion of the desired number of test runs on the test meter 22, the hoses 138,140 and the pulse generator 65 and the sensors 66,68 are detached from the test meter 22 and the existing gas inflow and outflow conduits are reattached to the test meter 22 to return it to normal service.

The described proving apparatus 10 has been subjected to a number of actual tests to verify its accuracy for proving the measuring accuracy of gas meters. For one such test, three rotary positive displacement type meters respectively of 38,000 CFH, 56,000 CFH, and 102,000 CFH capacities manufactured by Roots Dresser Corp. of Houston, Tex., were tested individually at a variety of differing flow rates, first, at the manufacturer's factory utilizing its 1,200 cubic feet capacity piston-type proving apparatus certified as a calibrated standard by the National Bureau of Standards and, then, utilizing the proving apparatus of the present invention. The comparative test results of each test run and the averages thereof for each such test meter are set forth in the charts herebelow and clearly exemplify an unusually small difference in the average percentage proofs for each tested meter, in each case significantly bettering the industry standard of ±0.5%.

| Flow Rate (CFH) | Roots-Dresser Prover (% Proof) | Present Apparatus (% Proof) |
|---|---|---|
| METER 1 - 38 M Rotary | | |
| 8000 | 100.11 | 100.2 |
| 20000 | 100.12 | 100.3 |
| 30000 | 100.01 | 100.2 |
| 38000 | 99.6 | 99.9 |
| Average Proof = | 99.96 | 100.15 |
| Meter 2 - 56 M Rotary | | |
| 10000 | 100.69 | 100.40 |
| 15000 | 100.55 | 100.45 |
| 20000 | 100.26 | 100.80 |
| 25000 | 100.26 | 100.35 |
| 35000 | 100.22 | 100.35 |
| 35000 | 100.90 | 100.25 |
| 40000 | 100.18 | 100.90 |
| 45000 | 100.11 | 100.05 |
| 50000 | 100.33 | 100.0 |
| 56000 | 99.83 | 100.0 |
| Average Proof = | 100.34 | 100.36 |
| Meter 3 - 102 M Rotary | | |
| 10000 | 100.39 | 100.70 |
| 20000 | 100.32 | 100.30 |
| 30000 | 101.01 | 100.25 |
| 40600 | 99.94 | 100.45 |
| 51000 | 99.93 | 100.50 |
| 60000 | 100.16 | 100.15 |
| 71000 | 100.1 | 99.85 |
| Average Proof = | 100.26 | 100.32 |

The meter proving apparatus of the present invention has also been tested for accuracy in proving the measuring accuracy of large capacity turbine type meters as well as rotary type meters. For this purpose, three turbine type meters manufactured by Rockwell International, Inc., a "Lab Standard" Model T-60 having a 60,000 CFH capacity, a Model MKII T-30 meter having a 30,000 CFH capacity, and a Model Auto Adjust AAT-60 meter having a 60,000 CFH capacity, were proof-tested individually at varying flow rates, first, on the manufacturer's factory proving equipment at its DuBois, Pa. factory and, then, on the meter proving apparatus of the present invention. For these tests, the Lab Standard T-60 meter and the T-30 meter were tested utilizing the manufacturer's 500 cubic feet bell-type prover, also certified by the National Bureau of Standards as a calibrated standard, while the Auto Adjust AAT-60 meter was tested utilizing the manufacturer's in house line prover. The results of these tests are set forth in the chart herebelow and again illustrate that the accuracy of the present proving apparatus is also better than the industry standard for proof testing turbine type meters.

| Flow Rate (CFH) | Rockwell Bell Prover (% Proof) | Present Apparatus (% Proof) |
|---|---|---|
| METER 1 - Lab Standard T-60 | | |
| 8000 | 100.19 | 100.0 |
| 18000 | 100.71 | 100.53 |
| 30000 | 100.74 | 100.75 |
| 40000 | 100.61 | 100.83 |
| 50000 | 100.59 | 100.65 |
| Average Proof = | 99.85 | 99.85 |
| METER 2 - T-30 | | |
| 9000 | 99.78 | 99.80 |
| 15000 | 99.97 | 99.95 |
| 24000 | 99.79 | 99.80 |
| Average Proof = | 99.85 | 99.85 |
| Meter 3 - Auto Adjust AAT-60 | | |
| 11500 | 99.86 | 100.20 |
| 24000 | 99.97 | 100.10 |

-continued

| Flow Rate (CFH) | Rockwell Bell Prover (% Proof) | Present Apparatus (% Proof) |
|---|---|---|
| 48000 | 99.99 | 100.00 |
| Average Proof = | 99.94 | 100.10 |

As will thus be apparent, the present proving apparatus advantageously satisfies a significant need in the gas industry for a reliable mobile apparatus capable of proving the accuracy of large capacity gas meters. Particularly, the present proving apparatus is uniquely adapted for proof testing of rotary pulsation type meters, while also being capable of equal accuracy for proof testing of turbine type meters. Several features of the present apparatus cooperate to substantially mitigate the deleterious effects of the inherent gas pulsations created by rotary type meters, which are believed to be the primary reason for the absence of any conventional proving apparatus capable of reference-type proof testing of rotary gas meters. First, in the present apparatus, the master reference meter is located upstream of the rotary test meter whereby the flow pulsations produced by the rotary test meter primarily downstream thereof are of a significantly lessened affect on the measuring accuracy of the reference meter. Furthermore, the pulsation dampener is located upstream of the rotary test meter between it and the master reference meter to further isolate the reference meter from the effect of the inherent flow pulsations produced by the test meter. Finally, the hoses 138,140 in the conduit system 20 of the present apparatus are of a greater cross-sectional area than the inlet and outlet openings of the test meter, thereby permitting volumetric expansion of the test airstream flowing through the present apparatus to further aid in smoothing and reducing the effects of the rotary pulsations of the test meter. Accordingly, the turbine master reference meter is essentially unaffected by the flow pulsations produced by the test meter and thereby provides a substantially precise measurement of gas flow volume during the conduct of proof tests utilizing the present apparatus so as to provide the most accurate calculation of the percentage proof of the test meter. Advantageously, the components of the present apparatus may be compactly and conveniently arranged on an ordinary flat bed truck or a conventional van-type truck for easy transportation to and from the field sites of meters to be tested. Finally, the present proving apparatus may be profitably manufactured and sold in a moderate price range between $60,000 and $100,000.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Apparatus for proving the gas flow measuring accuracy of a test meter of the rotary positive displacement type, comprising a master reference meter of the turbine wheel type, means for creating a moving gas stream at a selected flow rate, and means for directing a selected quantity of said gas stream successively first through said master reference meter and then though said test meter to permit comparison of the gas flow measurements by each thereof for determining the percentage accuracy of said test meter in comparison with said master reference meter; whereby the inherent rotar pulsations of said test meter do not significantly affect the gas flow measuring accuracy of said master reference meter to provide substantially accurate proving of the accuracy of said test meter.

2. Apparatus for proving the gas flow measuring accuracy of a test meter according to claim 1 and characterized further by pulsation dampening means for dampening flow pulsations in a gas stream flowing therethrough, said directing means being adapted for directing said selected quantity of said gs stream through said pulsation dampening means intermediate said master reference meter and said rotary test meter.

3. Apparatus for proving the gas flow measuring accuracy of a test meter according to claim 2 and characterized further in that said pulsation dampening means comprises conduit means for flow therethrough of said moving gas stream, said conduit means including a tubular housing having an entrance end section and an exit end section, baffle means intermediate said entrance and exit end sections for defining an indirect flow path for said moving gas stream through said tubular housing, said baffle means including an annular barrier wall extending transversely into the interior of said tubular housing intermediate its entrance and exit end sections and a flow pipe extending from within said entrance end section of said tubular housing to within said exit end section thereof through said barrier wall to provide fluid communication between said entrance and exit end sections, said flow pipe having an entrance opening in the portion thereof within said entrance end section, a plurality of peripheral exit openings arranged spirally about the portion of said flow pipe within said exit end section, and a plurality of tubular extension members fitted respectively in said exit openings and extending outwardly from said flow pipe at diverse respective angles thereto for dispersing said gas stream multidirectionally from said flow pipe in said exit end section of said tubular housing, thereby to dampen and smooth pulsations in said moving gas stream flowing through said apparatus.

4. Apparatus for proving the gas flow measuring accuracy of a test meter according to claim 3 and characterized further in that said conduit means further comprises a plurality of secondary tubular flow conduits each connected independently in fluid communication with said exit end section of said tubular housing, said secondary flow conduits being of differing cross-sectional areas and each having valve means for selectively opening and closing the respective secondary flow conduit for selective gas flow operation individually in relation to said selected flow rate, and each said secondary flow conduit having a restrictor nozzle therein for creating acceleration of said gas stream to further dampen said pulsations.

5. Apparatus for proving the gas flow measuring accuracy of a test meter according to claim 1 and characterized further in that said gas stream creating means includes blower means and said directing means is adapted to arrange said blower means downstream of said rotary test meter for drawing said selected quantity of said gas stream through said master reference meter and said rotary test meter.

6. Apparatus for proving the gas flow measuring accuracy of a test meter according to claim 5 and characterized further in that said directing means includes means for connecting the inlet of said blower means in fluid communication with the outlet of said rotary test meter and for connecting the inlet of said rotary test meter in fluid communication with the outlet of said master reference meter.

7. Apparatus for proving the gas flow measuring accuracy of a test meter according to claim 6 and characterized further in that said connecting means includes tubular conduit means of an oversized cross-sectional area in relation to the inlet and outlet of said rotary test meter for volumetric expansion of said gas stream in said conduit means to tend to smooth flow pulsations created in said moving gas stream by said rotary test meter.

8. Apparatus for proving the gas flow measuring accuracy of a test meter according to claim 1 and characterized further in that said rotary test meter and said master reference meter each include respective means for measuring gas flow therethrough, and characterized further by means operatively associated with said measuring means of each said meter for correcting the gas flow measurements thereof for the prevailing pressure and temperature of said gas stream, comparing said corrected measurements and calculating the percentage accuracy of said rotary test meter in comparison with said master reference meter.

9. Apparatus for proving the gas flow measuring accuracy of a test meter according to claim 1 and characterized further in that said gas stream creating means is selectively adjustable for varying said selected flow rate of said gas stream for proving said test meter at varying flow rates representing differing degrees of the capacity of said test meter.

10. Apparatus for proving the gas flow measuring accuracy of a test gas meter of the rotary positive displacement type having a rotary valve member adapted during rotation to pulsingly capture and convey essentially discrete measured quantities of gas and means for measuring gas flow through said rotary test meter in direct relation to the number of revolutions of said rotary valve member, said apparatus comprising a master reference meter of the turbine wheel type having a rotary turbine wheel adapted to be rotated kinetically by the flow of gas therethrough and means for measuring gas flow through said master reference meter in direct relation to the speed of rotation of said turbine wheel; blower means for creating a moving ambient airstream at a flow rate selected in relation to the capacity of said rotary test meter; pulsation dampening means for dampening flow pulsations in a gas stream flowing therethrough; and means for connecting the inlet of said blower means in fluid communication with the outlet of said rotary test meter, for connecting the inlet of said rotary test meter in fluid communication with the outlet of said pulsation dampening means, for connecting the inlet of said pulsation dampening means in fluid communication with the outlet of said meter reference meter, and for connecting the outlet of said blower means and the inlet of said master reference meter in fluid communication with the ambient atmosphere for drawing a selected quantity of said moving airstream successively first through said master reference meter, then through said pulsation dampening means, and then through said rotary test meter to isolate said master reference meter from, and minimize the affect on said master reference meter of, the inherent rotary pulsations of said rotary test meter for accurate gas flow measurement by said master reference meter; whereby said master reference meter is arranged to accurately measure said selected airstream quantity to facilitate substantially accurate proving of the accuracy of said rotary test meter.

11. Apparatus for proving the gas flow measuring accuracy of a test gas meter according to claim 10 and characterized further by a mobile test vehicle on which each of said master reference meter, said blower means, said pulsation dampening means, and said connecting means are disposed in operative relationship for transportation to and from test meters in field use for in situ proving thereof.

12. Apparatus for proving the gas flow measuring accuracy of a test gas meter according to claim 10 and characterized further in that said blower means is selectively adjustable for varying said selected flow rate of said airstream for proving said test meter at varying flow rates representing differing degrees of the capacity of said rotary test meter.

13. Apparatus for proving the gas flow measuring accuracy of a test gas meter according to claim 10 and characterized further in that said connecting means includes tubular conduit means of an oversized cross-sectional area in relation to the inlet and outlet of said rotary test meter for volumetric expansion of said airstream in said conduit means to tend to smooth flow pulsations created in said moving airstream by said rotary test meter.

14. Apparatus for proving the gas flow measuring accuracy of a test gas meter according to claim 10 and characterized further in that said pulsation dampening means comprises conduit means for flow therethrough of said moving gas stream, said conduit means including a tubular housing having an entrance end section and an exit section, baffle means intermediate said entrance and exit end sections for defining an indirect flow path for said moving gas stream through said tubular housing, said baffle means including an annular barrier wall extending transversely into the interior of said tubular housing intermediate its entrance and exit end sections and a flow pipe extending from within said entrance end section of said tubular housing to within said exit section thereof through said barrier wall to provide fluid communication between said entrance and exit end sections, said flow pipe having an entrance opening in the portion thereof within said entrance end section, a plurality of peripheral exit openings arranged spirally about the portion of said flow pipe within said exit end section, and a plurality of tubular extension members fitted respectively in said exit openings and extending outwardly from said flow pipe at diverse respective angles thereto for dispersing said gas stream multidirectionally from said flow pipe in said exit end section of said tubular housing, thereby to dampen and smooth pulsations in said moving gas stream flowing through said apparatus.

15. Apparatus for proving the gas flow measuring accuracy of a test gas meter according to claim 14 and characterized further in that said conduit means further comprises a plurality of secondary tubular flow conduits each connected independently in fluid communication with said exit end section of said tubular housing, said secondary flow conduits being of differing cross-sectional areas and each having valve means for selectively opening and closing the respective secondary flow conduit for selective gas flow operation individually in relation to said selected flow rate, and each said secondary flow conduit having a restrictor nozzle therein for creating acceleration of said airstream to further dampen said pulsations.

16. Apparatus for proving gas flow measuring accuracy of a test gas meter according to claim 10 and characterized further by microprocessor means operatively associated respectively with said measuring means of each of said rotary test meter and said master reference meter for correcting the gas flow measurements by each thereof for the prevailing pressure and temperature of said airstream quantity, comparing said corrected measurements, and calculating the percentage accuracy of said rotary test meter in comparison with said master reference meter.

17. A method of proving the gas flow measuring accuracy of a test meter of the rotary positive displacement type, comprising performing the steps of creating a moving gas stream at a selected flow rate and directing a selected quantity of said gas stream successively first through a master reference meter of the turbine wheel type and then through said test meter to permit comparison of the gas flow measurements by each thereof for determining the percentage accuracy of said test meter in comparison with said master reference meter; whereby the natural rotary pulsations of said test meter do not significantly affect the gas flow measuring accuracy of said meter reference meter to provide substantially accurate proving of the accuracy of said test meter.

18. A method of proving the gas flow measuring accuracy of a test meter according to claim 17 and characterized further by providing pulsation dampening means adapted for dampening flow pulsations in a gas stream flowing therethrough, said directing including directing said selected quantity of said gas stream through said pulsation dampening means intermediate said master reference meter and said rotary test meter to isolate said master reference meter from the inherent rotary pulsations of said rotary test meter to further minimize the affect thereof on the accuracy of said master reference meter.

19. A method of proving the gas flow measuring accuracy of a test meter according to claim 18 and characterized further by causing said gas stream to flow in an indirect flow path through said pulsation dampening means, including causing said gas stream to be dispersed multi-directionally within said pulsation dampening means, thereby to dampen and smooth pulsations in said moving gas stream flowing therethrough.

20. A method of proving the gas flow measuring accuracy of a test meter according to claim 19 and characterized further by causing said gas stream to flow through a secondary tubular flow conduit of a selected cross-sectional area in relation to said selected flow rate and through a restrictor nozzle therein for creating acceleration of said gas stream to further dampen said pulsations.

21. A method of proving the gas flow measuring accuracy of a test meter according to claim 17 and characterized further in that said directing includes drawing said gas stream through said master reference meter and said rotary test meter from downstream of said rotary test meter.

22. A method of proving the gas flow measuring accuracy of a test meter according to claim 21 and characterized further by providing blower means for creating said moving gas stream and characterized further in that said directing includes connecting the inlet of said blower means in fluid communication with the outlet of said rotary test meter and connecting the inlet of said rotary test meter in fluid communication with the outlet of said master reference meter.

23. A method of proving the gas flow measuring accuracy of a test meter according to claim 22 and characterized further in that said connecting includes providing tubular conduit means between said master reference meter and said rotary test meter and between said rotary test meter and said blower means of an oversized cross-sectional area in relation to the inlet and outlet of said rotary test meter for volumetric expansion of said gas stream in said conduit means to tend to smooth flow pulsations created in said moving gas stream by said rotary test meter.

24. A method of proving the gas flow measuring accuracy of a test meter according to claim 17 and characterized further in that said rotary test meter and said master reference meter each include respective means for measuring gas flow therethrough, and characterized further by correcting the gas flow measurements of said meters for the prevailing pressure and temperature of said gas stream, comparing said corrected measurements and calculating the percentage accuracy of said rotary test meter in comparison with said master reference meter.

25. A method of proving the gas flow measuring accuracy of a test meter according to claim 17 and characterized further by selectively varying said selected flow rate of said gas stream for proving said test meter at varying flow rates representing differing degrees of the capacity of said test meter.

26. A method of proving the gas flow measuring accuracy of a test gas meter of the rotary positive displacement type having a rotary valve member adapted during rotation to pulsingly capture and convey essentially discrete measured quantities of gas and means for measuring gas flow through said rotary test meter in direct relation to the number of revolutions of said rotary valve member, said method comprising the steps of providing a master reference meter of a known repeatably accurate gas flow measuring capability, said master reference meter being of the turbine wheel type having a rotary turbine wheel adapted to be rotated kinetically by the flow of gas therethrough and means for measuring gas flow through said master reference meter in direct relation to the speed of rotation of said turbine wheel; providing blower means adapted for creating a moving airstream; providing pulsation dampening means adapted for dampening flow pulsations in a gas stream flowing therethrough; connecting the inlet of said blower means in fluid communication with the outlet of said rotary test meter, connecting the inlet of said rotaty test meter in fluid communication with the outlet of said pulsation dampening means, connecting the inlet of said pulsation dampening means in fluid communication with the outlet of said master reference meter, and connecting the outlet of said blower means and the inlet of said master reference meter in fluid communication with the ambient atmosphere; operating said blower means for creating a moving ambient airstream at a flow rate selected in relation to the capacity of said rotary test meter for drawing a selected quantity of said moving airstream successively first through said master reference meter, then through said pulsation dampening means and then through said rotary test meter to isolate said master reference meter from, and to minimize the affect on said master reference meter of, the inherent rotary pulsations of said rotary test meter for accurate gas flow measurement by said master reference meter; and correcting the gas flow measurements of said selected airstream quantity by each of said rotary test meter and said master reference meter for the prevailing pressure and temperature of said airstream at each said meter, comparing said corrected measurements and calculating the percentage accuracy of said rotary test meter in comparison with said master reference meter; whereby said master reference meter is arranged to accurately measure said selected airstream quantity to facilitate substantially accurate proving of the accuracy of said rotary test meter.

27. A method of proving the gas flow measuring accuracy of a test gas meter according to claim 26 and characterized further by providing tubular conduit means for accomplishing said connecting; providing microprocessor means for accomplishing said comparing and calculating; and providing a mobile test vehicle on which each of said meter reference meter, said blower means, said pulsation dampening means, said connecting means and said microprocessor means are disposed in operative relationship; and transporting said vehicle to and from test meters in field use for in situ proving thereof.

28. A method of proving the gas flow measuring accuracy of a test gas meter according to claim 26 and characterized further by selectively adjusting said blower means for varying said selected flow rate of said airstream for proving said test meter at varying flow rates representing differing degrees of the capacity of said rotary test meter.

29. A method of proving the gas flow measuring accuracy of a test gas meter according to claim 26 and characterized further in that said connecting includes providing tubular conduit means between said master reference meter and said rotary test meter and between said rotary test meter and said blower means of an oversized cross-sectional area in relation to the inlet and outlet of said rotary test meter for volumetric expansion of said gas stream in said conduit means to tend to smooth flow pulsations created in said moving gas stream by said rotary test meter.

30. A method of proving the gas flow measuring accuracy of a test gas meter according to claim 26 and characterized further by causing said gas stream to flow in an indirect flow path through said pulsation dampening means, including causing said gas stream to be dispersed multi-directionally within said pulsation dampening means, thereby to dampen and smooth pulsations in said moving gas stream flowing therethrough.

31. A method of proving the gas flow measuring accuracy of a test gas meter according to claim 30 and characterized further by causing said gas stream to flow through a secondary tubular flow conduit of a selected cross-sectional area in relation to said selected flow rate and through a restrictor nozzle therein for creating acceleration of said gas stream to further dampen said pulsations.

32. Apparatus for dampening the inherent rotary pulsations in a moving gas stream such as flowing through a rotary meter of the positive displacement pulsation type, comprising conduit means for flow therethrough of said moving gas stream, said conduit means including a tubular housing having an entrance end section and an exit end section, baffle means intermediate said entrance and exit end sections for defining an indirect flow path for said moving gas stream through said tubular housing, said baffle means including an annular barrier wall extending transversely into the interior of said tubular housing intermediate its entrance and exit end sections and a flow pipe extending from within said entrance end section of said tubular housing to within said exit end section thereof through said barrier wall to provide fluid communication between said entrance and exit end sections, said flow pipe having an entrance opening in the portion thereof within said entrance end section, a plurality of peripheral exit openings arranged spirally about the portion of said flow pipe within said exit end section, and a plurality of tubular extension members fitted respectively in said exit openings and extending outwardly from said flow pipe at diverse respective angles thereto for dispersing said gas stream multi-directionally from said flow pipe in said exit end section of said tubular housing, thereby to dampen and smooth pulsations in said moving gas stream flowing through said apparatus.

33. Apparatus for dampening the inherent rotary pulsations in a moving gas stream according to claim 32 and characterized further in that said conduit means further comprises a plurality of secondary tubular flow conduits each connected independently in fluid communication with said exit end section of said tubular housing, said secondary flow conduits being of differing cross-sectional areas and each having valve means for selectively opening and closing the respective secondary flow conduit for selective gas flow operation individually in relation to said selected flow rate, and each said secondary flow conduit having a restrictor nozzle therein for creating acceleration of said gas stream to further dampen said pulsations.

* * * * *

UNITED STATES PATENT OFFICE
CERTIFICATE OF CORRECTION

Patent No. 4,658,634                    Dated    April 21, 1987

Inventor(s) Ray B. Killough, Alan S. Higgins and Thomas M. Broome

It is certified that error appears in the above-identified patent and that said Letters Patent are hereby corrected as shown below:

Col. 1, Line 58, delete "manufacture" and insert therefor — manufacturer —.
Col. 2, Line 14, delete "manufactures" and insert therefor — manufacturers —.
Col. 2, Line 31, delete "meter" and insert therefor — master — .
Col. 3, Line 45, delete "in" and insert therefor — the — .
Col. 4, Line 47, delete "master" and insert therefor — meter — .
Col. 5, Line 7, delete "ares" and insert therefor — areas — .

Col. 9, Line 21, delete "master" and insert therfor — meter — .

Col. 10, Line 52, delete "electricl" and insert therefor — electrical — .
Col. 14, Line 11, delete "though" and insert therefor — through — .
Col. 14, Line 15, delete "rotar" and insert therefor — rotary — .
Col. 14, Line 25, delete "gs" and insert therefor — gas — .
Col. 16, Line 2, delete "meter", first occurrence thereof, and insert therefor — master — .
Col. 16, Line 47, between "exit" and "section" insert — end — .
Col. 16, Line 54, between "exit" and "sec-" insert — end — .
Col. 18, Line 65, delete "rotaty" and insert therefor — rotary — .

Signed and Sealed this

Second Day of February, 1988

Attest:

DONALD J. QUIGG

Attesting Officer      Commissioner of Patents and Trademarks